(12) United States Patent
Cho et al.

(10) Patent No.: US 9,972,443 B2
(45) Date of Patent: May 15, 2018

(54) TANTALUM CAPACITOR

(71) Applicant: SAMSUNG ELECTRO-MECHANICS CO., LTD., Suwon-Si, Gyeonggi-Do (KR)

(72) Inventors: Jae Bum Cho, Suwon-Si (KR); Hee Sung Choi, Suwon-Si (KR); Hong Kyu Shin, Suwon-Si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 19 days.

(21) Appl. No.: 14/974,816

(22) Filed: Dec. 18, 2015

(65) Prior Publication Data

US 2016/0217935 A1    Jul. 28, 2016

(30) Foreign Application Priority Data

Jan. 27, 2015  (KR) .......................... 10-2015-0012647

(51) Int. Cl.
| | |
|---|---|
| *H01G 9/10* | (2006.01) |
| *H01G 9/012* | (2006.01) |
| *H01G 9/042* | (2006.01) |
| *H01G 9/052* | (2006.01) |
| *H01G 9/04* | (2006.01) |

(52) U.S. Cl.
CPC ........... *H01G 9/012* (2013.01); *H01G 9/0425* (2013.01); *H01G 9/052* (2013.01); *H01G 9/10* (2013.01); *H01G 2009/05* (2013.01)

(58) Field of Classification Search
CPC ........ H01G 9/012; H01G 9/028; H01G 9/035; H01G 9/042; H01G 9/045; H01G 9/10
See application file for complete search history.

(56) References Cited

U.S. PATENT DOCUMENTS

| | | | |
|---|---|---|---|
| 6,238,444 B1 * | 5/2001 | Cadwallader .......... | H01G 9/012 29/25.03 |
| 7,139,163 B2 * | 11/2006 | Sawano ................ | H01G 2/065 361/528 |
| 2006/0262486 A1 * | 11/2006 | Tadanobu .............. | H01G 9/012 361/523 |

(Continued)

FOREIGN PATENT DOCUMENTS

| | | |
|---|---|---|
| JP | 2003-332173 A | 11/2003 |
| KR | 10-2011-0039519 A | 4/2011 |

*Primary Examiner* — Nguyen Ha
(74) *Attorney, Agent, or Firm* — McDermott Will & Emery LLP

(57) ABSTRACT

A tantalum capacitor includes a capacitor body containing tantalum powder, having a rectangular parallelepiped shape, and including a plurality of tantalum wires spaced apart from each other in a long axis direction of the rectangular parallelepiped shape and protruding from one side surface thereof perpendicular to the long axis direction; a conductive layer provided on one side surface of the capacitor body to be spaced apart from the tantalum wires; a sealing part enclosing the tantalum wires, the conductive layer, and the capacitor body and allowing end portions of the tantalum wires and a surface of the conductive layer to be exposed by the sealing part; an anode terminal provided on one side surface of the sealing part; and a cathode terminal provided on one side surface of the sealing part.

7 Claims, 2 Drawing Sheets

(56) References Cited

U.S. PATENT DOCUMENTS

| | | | |
|---|---|---|---|
| 2006/0285276 A1* | 12/2006 | Kuriyama | H01G 9/14 361/523 |
| 2007/0137434 A1* | 6/2007 | Omori | B22F 1/02 75/244 |
| 2008/0080124 A1* | 4/2008 | Kim | H01G 9/012 361/529 |
| 2009/0103246 A1* | 4/2009 | Monroe | H01G 4/232 361/528 |
| 2009/0159323 A1* | 6/2009 | Ota | H01B 1/24 174/260 |
| 2009/0199378 A1* | 8/2009 | Chacko | H01G 9/012 29/25.03 |
| 2010/0302712 A1* | 12/2010 | Zednicek | H01G 9/012 361/525 |
| 2015/0116909 A1* | 4/2015 | Kwak | H01G 9/042 361/529 |

* cited by examiner ized for premium electronic products such as smartphones, demand for a capacitor capable of being driven at a high frequency has increased, but a general tantalum capacitor does not satisfy this demand.

TANTALUM CAPACITOR

CROSS-REFERENCE TO RELATED APPLICATION

This application claims benefit of priority to Korean Patent Application No. 10-2015-0012647 filed on Jan. 27, 2015, with the Korean Intellectual Property Office, the disclosure of which is incorporated herein by reference.

TECHNICAL FIELD

The present disclosure relates to a tantalum capacitor, and more particularly, to a tantalum capacitor including a plurality of tantalum wires.

BACKGROUND

Tantalum (Ta) is a material widely used throughout various industrial sectors, such as in the aerospace industry and in the defense sector, as well as in the electrical, electronic, mechanical, and chemical fields, due to desirable mechanical and physical properties such as a high melting point, excellent flexibility, excellent corrosion resistance, and the like.

Since tantalum can form a stable anodic oxide film, tantalum has been widely used as a material for positive electrodes of small capacitors. In accordance with the rapid development of information technology (IT), information and communications technology (ICT) and electronics technology, the use of tantalum has been increasing every year.

Generally, a capacitor is a condenser temporarily storing electricity therein, and includes two flat plate electrodes. Two flat plate electrodes are disposed in close proximity to each other, and insulated from each other when a dielectric substance is inserted therebetween. The two plate electrodes may be charged with electrical charges due to attractive force, thereby allowing electricity to be accumulated therein. Such a capacitor stores electrical charges and electrical fields in a space enclosed by two conductors, and is commonly used to acquire capacitance.

A tantalum capacitor containing a tantalum material has a structure in which voids are formed when tantalum powder is sintered and hardened.

For example, the tantalum capacitor may be completed by forming tantalum oxide ($Ta_2O_5$) on a hardened tantalum surface using an anodic oxidation method, forming a manganese dioxide ($MnO_2$) layer, an electrolyte, on the tantalum oxide acting as a dielectric substance, forming a carbon layer and a metal layer on the manganese dioxide layer to form a body, forming an anode terminal and a cathode terminal on the body to be connected thereto for mounting thereof on a printed circuit board (PCB), and forming a sealing part.

There is no direct current (DC)-bias direction in the tantalum capacitor, and the tantalum capacitor has no affect in regard to acoustic noise. In the tantalum capacitor, equivalent series inductance (ESL) is defined as parasitic inductance on a circuit, and it is significantly important when designing a power supply unit, or the like, to decrease equivalent series inductance of the tantalum capacitor.

Recently, however, with the introduction of premium electronic products such as smartphones, demand for a capacitor capable of being driven at a high frequency has increased, but a general tantalum capacitor does not satisfy this demand.

SUMMARY

An aspect of the present disclosure may provide a tantalum capacitor capable of implementing low equivalent series inductance (ESL) and equivalent series resistance (ESR) in a high frequency band.

According to an aspect of the present disclosure, a tantalum capacitor may include a capacitor body containing tantalum powder, having a rectangular parallelepiped shape, and including a plurality of tantalum wires spaced apart from each other in a long axis direction of the rectangular parallelepiped shape and protruding from one side surface thereof perpendicular to the long axis direction, a conductive layer provided on the one side surface of the capacitor body in the long axis direction to be spaced apart from the tantalum wires to be parallel with the tantalum wires, a sealing part enclosing the tantalum wires, the conductive layer, and the capacitor body and allowing respective end portions of the tantalum wires and a surface of the conductive layer to be exposed by the sealing part, an anode terminal provided on one side surface of the sealing part to be connected to the exposed end portions of the tantalum wires, and a cathode terminal provided on the one side surface of the sealing part to be connected to the exposed surface of the conductive layer.

Carbon may be entirely applied onto the one side surface of the capacitor body except for portions of the one side surface on which the plurality of tantalum wires are disposed.

The conductive layer may contain silver.

The conductive layer may occupy 30% to 70% of an area of the one side surface of the capacitor body.

The sealing part may contain an epoxy molding compound.

The anode terminal and the cathode terminal may contain one of a chromium titanium intermetallic compound, copper, nickel, palladium, gold, and a combination thereof.

The anode terminal and the cathode terminal may be provided on the one side surface of the sealing part in the long axis direction to be in parallel with each other.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Figure 1:
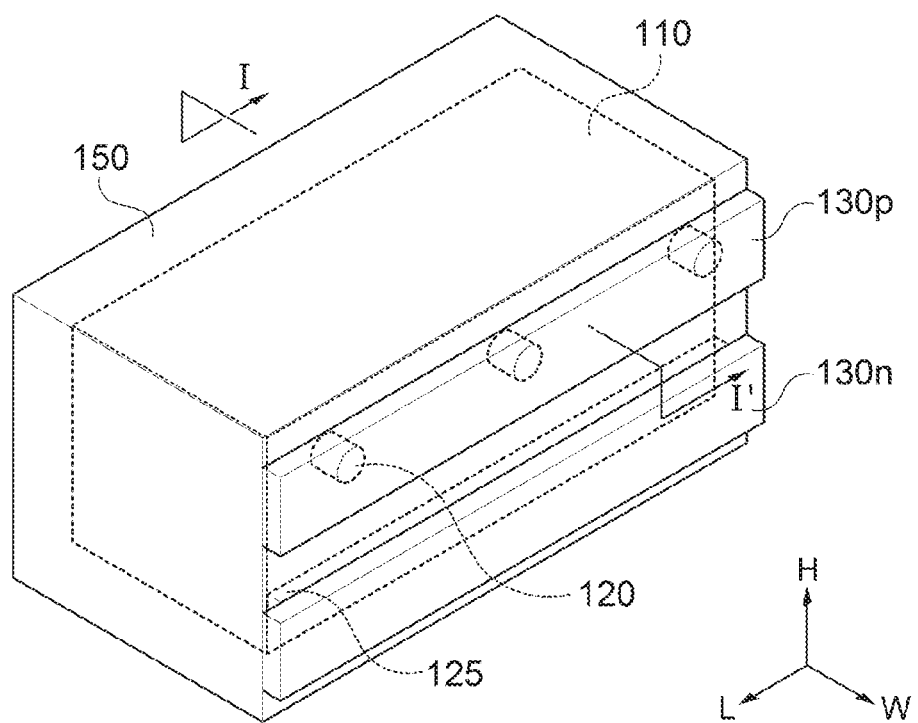
FIG. 1 is a stereoscopic view schematically illustrating a tantalum capacitor according to an exemplary embodiment in the present disclosure.

Hereinafter, embodiments of the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Figure 2:
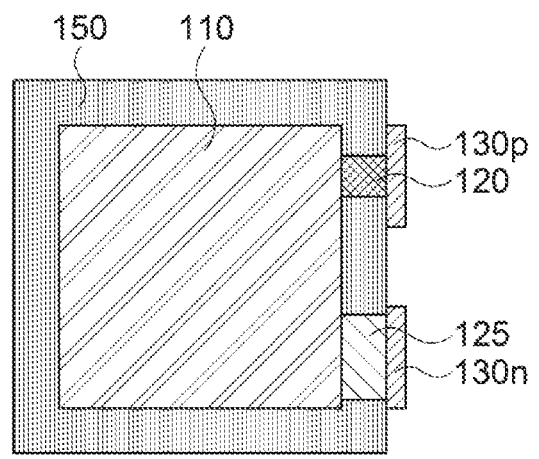
FIG. 2 is a cross-sectional view of the tantalum capacitor according to the exemplary embodiment in the present disclosure, taken along line I-I' of FIG. 1.
Figure 3:
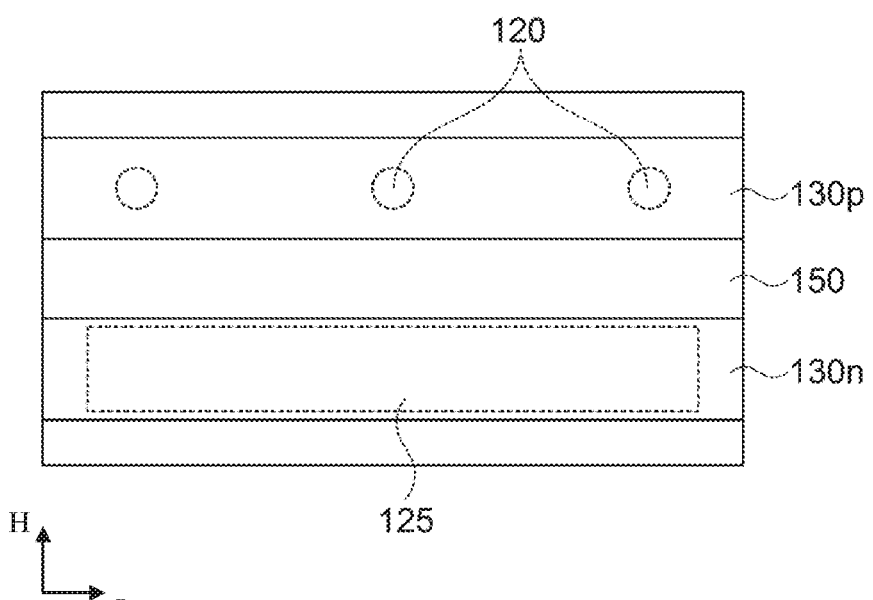
FIG. 3 is a front view of the tantalum capacitor according to the exemplary embodiment in the present disclosure of FIG. 1.

FIG. 1 is a stereoscopic view schematically illustrating a tantalum capacitor according to an exemplary embodiment, FIG. 2 is a cross-sectional view of the tantalum capacitor according to the exemplary embodiment, taken along line I-I' of FIG. 1, and FIG. 3 is a front view of the tantalum capacitor according to the exemplary embodiment of FIG. 1.

Referring to FIGS. 1 through 3, the tantalum capacitor may include a capacitor body 110 in which a plurality of tantalum wires 120 protrude from one side surface thereof in a direction perpendicular to a long axis direction of a rectangular parallelepiped shape, a conductive layer 125 provided on one side surface of the capacitor body 110 in the long axis direction to be spaced apart from the tantalum wires 120 and be in parallel therewith, a sealing part 150 enclosing the tantalum wires 120, the conductive layer 125, and the capacitor body 110, an anode terminal 130p electrically connected to the tantalum wires 120, and a cathode terminal 130n electrically connected to the capacitor body 110 through the conductive layer 125.

In the tantalum capacitor according to the exemplary embodiment, a "length direction" refers to an "L" direction of FIG. 1, a "width direction" refers to a "W" direction of FIG. 1, and a "height direction" refers to an "H" direction of FIG. 1. Here, the "length direction" may be defined as the "long axis direction" of the capacitor body 110.

The capacitor body 110 may have a negative polarity. The capacitor body 110 may have a rectangular parallelepiped shape. However, the shape of the capacitor body 110 is not limited thereto. For instance, the capacitor body 110 may have a polyhedron shape having a long axis direction.

The capacitor body 110 may be manufactured by mixing and stirring tantalum powder and a binder at a predetermined ratio, compressing the mixed and stirred resultant to form a rectangular parallelepiped, and then sintering the formed rectangular parallelepiped at a high temperature under a high vacuum atmosphere.

The capacitor body 110 may be manufactured by inserting the tantalum wires 120 into the mixture of the tantalum powder and the binder to form a tantalum element having a desired size and then sintering the tantalum element at about 1,000° C. to 2,000° C. and $10^{-5}$ torr or less for about 30 minutes.

If necessary, carbon (C) and silver (Ag) may be applied onto a surface of the capacitor body 110. Carbon may be used to decrease contact resistance at the surface of the capacitor body 110, and silver may be used to lead a cathode. Preferably, carbon may be entirely applied onto only one side surface of the capacitor body 110 of the tantalum capacitor except for where the plurality of tantalum wires 120 are formed. For instance, except for one side surface of the capacitor body 110, carbon may not be applied onto remaining sides of the capacitor body 110 and opposite end surfaces thereof in the L direction, which is the length direction.

The tantalum wires 120 may have a positive polarity. In this case, before the mixed and stirred resultant of the tantalum powder and the binder is compressed, the tantalum wires 120 may be inserted and mounted into the capacitor body 110 so that the tantalum wires deviate from the center of one side surface of the capacitor body 110. For instance, the tantalum wires are disposed at positions biased upwardly in the H direction (the height direction) of the capacitor body 110 in one side surface thereof, a mounting surface, to be spaced apart from each other in the long axis direction, for example, the L direction (the length direction).

The conductive layer 125 may be provided on one side surface of the capacitor body 110 to be spaced apart from the tantalum wires 120 and be parallel with the tantalum wires 120. For instance, the conductive layer 125 may contact the capacitor body 110 so that the conductive layer 125 is disposed on a position biased downwardly in the H direction (the height direction) in one side surface of the capacitor body 110, the mounting surface. The conductive layer 125 may contain silver. Preferably, the conductive layer according to the exemplary embodiment may be formed on one side surface of the capacitor body 110 by a method of dispensing a silver paste. Therefore, the conductive layer 125 may serve to support the capacitor body 110 in a process of manufacturing the tantalum capacitor. The conductive layer 125 may occupy 30% to 70% of an area of one side surface of the capacitor body 110.

The sealing part 150 may enclose the tantalum wires 120, the conductive layer 125, and the capacitor body 110 and may expose an end portion of each of the tantalum wires 120 and a surface of the conductive layer 125 to one side surface of the capacitor body 110. The sealing part 150 may serve to protect the capacitor body 110, the tantalum wires 120, and the conductive layer 125 from external factors. The sealing part 150 may contain an epoxy molding compound (EMC). However, a material of the sealing part 150 is not limited thereto. For instance, the sealing part 150 may contain another insulating material such as a silica based insulation material, or the like.

The anode terminal 130p may be provided on one side surface of the sealing part 150 to be connected to the exposed end portions of the tantalum wires 120. The anode terminal 130p may contain one of a chromium titanium intermetallic compound (Cr—Ti), copper (Cu), nickel (Ni), palladium (Pd), gold (Au), and a combination thereof. The anode terminal 130p may be formed by a sputter deposition method or a plating method. The anode terminal 130p may be used as a connection terminal for electrical connection with an external circuit.

The cathode terminal 130n may be provided on one side surface of the sealing part 150 to be connected to the exposed surface of the conductive layer 125. The cathode terminal 130n may contain one of a chromium titanium intermetallic compound, copper, nickel, palladium, gold, and a combination thereof. The cathode terminal 130n may be formed by a sputter deposition method or a plating method. The cathode terminal 130n may be used as a connection terminal for electrical connection with an external circuit.

The anode terminal 130p and the cathode terminal 130n may be provided on one side surface of the sealing part 150 to be parallel with each other. For instance, the anode terminal 130p and the cathode terminal 130n may be simultaneously formed on one side surface of the sealing part 150.

Generally, in order to decrease equivalent series inductance of a capacitor, the shorter a current loop, which is a distance between the anode terminal 130p and the cathode terminal 130n, and the larger the number of current paths through which current passes, the more advantageous it is.

In the tantalum capacitor according to the exemplary embodiment, the anode terminal 130p and the cathode terminal 130n may be formed on one surface of the tantalum capacitor, and thus the tantalum capacitor may have a structure in which there is no terminal board for additional electrical connection with the anode terminal 130p and the cathode terminal 130n. Therefore, since the tantalum capacitor may have a structure in which the distance between the anode terminal 130p and the cathode terminal 130n is significantly decreased, and thus, the current loop for connection between the anode terminal 130p and the cathode terminal 130n is significantly short, equivalent series inductance of the tantalum capacitor may be decreased.

In general, in order to decrease equivalent series resistance of a capacitor, the wider a contact cross-sectional area of each of the anode terminal 130p and the cathode terminal 130n, the more advantageous it is.

Since the tantalum capacitor according to the exemplary embodiment may include the conductive layer 125 and the plurality of tantalum wires 120 having the same distance from the conductive layer 125 formed on one side surface of the capacitor body and are provided thereon in the long axis direction, the tantalum capacitor may have a structure in which contact cross-sectional areas between the anode terminal 130p and the plurality of tantalum wires 120, and between the cathode terminal 130n and the conductive layer 125 are increased, and thus equivalent series resistance of the tantalum capacitor may be decreased.

The tantalum capacitor according to the exemplary embodiment may include the anode terminal and the cathode terminal provided on one surface thereof, and thus equivalent series inductance of the tantalum capacitor may be decreased. Therefore, a tantalum capacitor capable of implementing significantly low equivalent series inductance in a high frequency band may be provided.

Further, the tantalum capacitor according to the exemplary embodiment may include the capacitor body having the plurality of tantalum wires, and thus equivalent series resistance of the tantalum capacitor may be decreased. Therefore, a tantalum capacitor capable of implementing significantly low equivalent series resistance in a high frequency band may be provided.

As set forth above, according to exemplary embodiments, the anode terminal and the cathode terminal are provided on one surface of the tantalum capacitor, and thus equivalent series inductance of the tantalum capacitor may be decreased. Therefore, the tantalum capacitor capable of implementing significantly low equivalent series inductance in a high frequency band may be provided.

Further, according to exemplary embodiments, the capacitor body has the plurality of tantalum wires, and thus equivalent series resistance of the tantalum capacitor may be decreased. Therefore, the tantalum capacitor capable of implementing significantly low equivalent series resistance in a high frequency band may be provided.

While exemplary embodiments have been shown and described above, it will be apparent to those skilled in the art that modifications and variations could be made without departing from the scope of the present invention as defined by the appended claims.

What is claimed is:
1. A tantalum capacitor comprising:
a capacitor body containing tantalum powder, having a rectangular parallelepiped shape, and including a plurality of tantalum wires spaced apart from each other in a long axis direction of the rectangular parallelepiped shape and protruding from one side surface thereof perpendicular to the long axis direction;
a conductive layer extending in the long axis direction and provided on the one side surface of the capacitor body to be spaced apart from the tantalum wires to be parallel with the tantalum wires;
a sealing part enclosing the tantalum wires, the conductive layer, and the capacitor body and allowing respective end portions of the tantalum wires and a surface of the conductive layer to be exposed by the sealing part;
an anode terminal provided only on one side surface of the sealing part, covering the end portions of the tantalum wires exposed to the one side surface of the sealing part, and electrically connected to the tantalum wires; and
a cathode terminal provided only on the one side surface of the sealing part, covering the surface of the conductive layer exposed to the one side surface of the sealing part, electrically connected to the conductive layer, and extending perpendicularly with respect to a direction to which each of a plurality of the tantalum wires extends.

2. The tantalum capacitor of claim 1, wherein the one side surface of the capacitor body except for portions of the one side surface on which the plurality of tantalum wires are disposed is entirely covered by a carbon.

3. The tantalum capacitor of claim 1, wherein the conductive layer comprises silver.

4. The tantalum capacitor of claim 1, wherein the conductive layer occupies 30% to 70% of an area of the one side surface of the capacitor body.

5. The tantalum capacitor of claim 1, wherein the sealing part contains an epoxy molding compound.

6. The tantalum capacitor of claim 1, wherein the anode terminal and the cathode terminal contain one of a chromium titanium intermetallic compound, copper, nickel, palladium, gold, and a combination thereof.

7. The tantalum capacitor of claim 1, wherein the anode terminal and the cathode terminal are provided on the one side surface of the sealing part in the long axis direction to be in parallel with each other.

* * * * *